Patented Apr. 5, 1927.

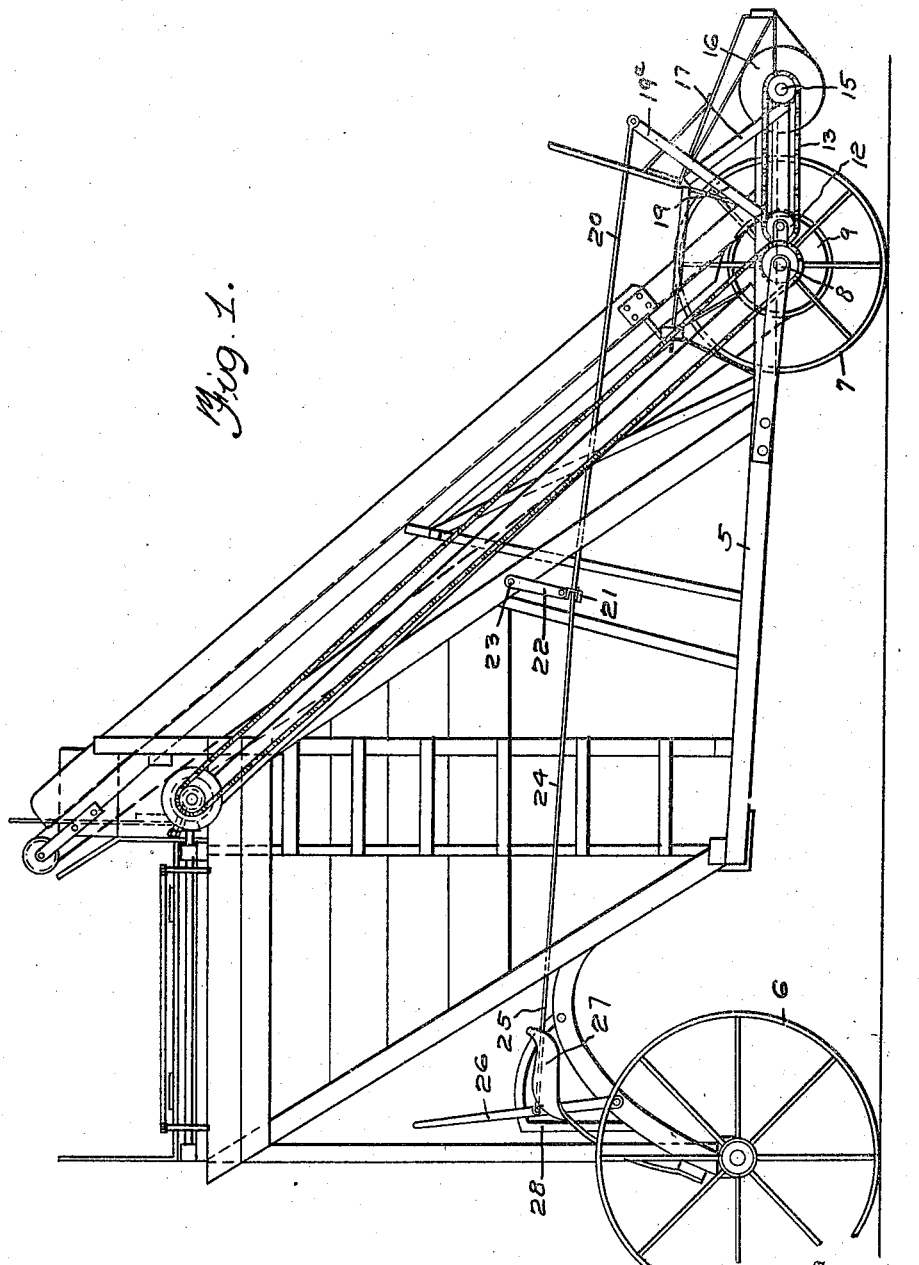

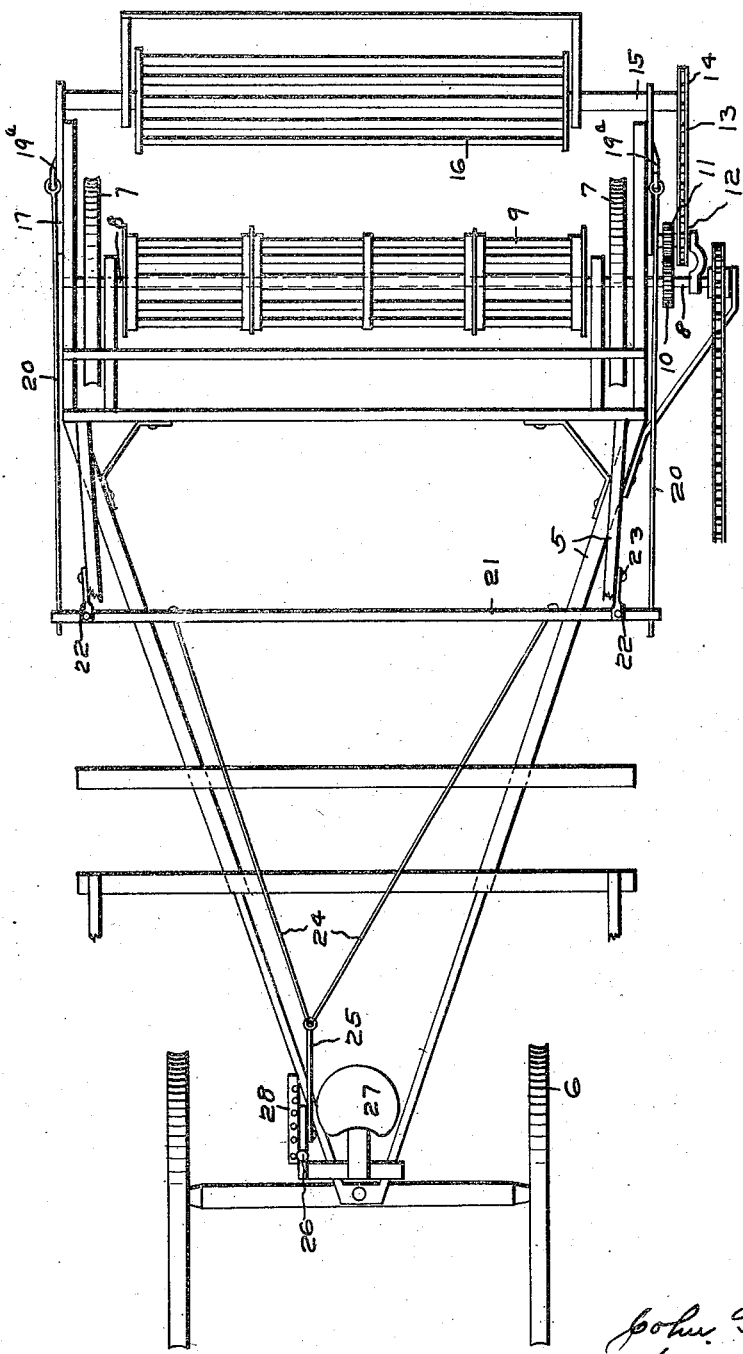

1,623,447

UNITED STATES PATENT OFFICE.

JOHN G. TAYLOR AND HIRAM STOKER, OF LOVELOCK, NEVADA.

HAY LOADER.

Application filed June 18, 1924. Serial No. 720,849.

This invention relates to hay loaders and more particularly to a hay loader of the character of that illustrated in Letters Patent of the United States #1,405,808, issued to us on February 7th, 1922.

The present application is intended to cover certain improvements which we have devised in connection with the hay loader of the patent above referred to, these improvements comprising means for raising or lowering the rear cylinder of the hay loader. With the ordinary hay loader this is done by the loading man or wagon driver who lifts by hand, first one end of the cylinder and then the other, inserting pins in holes in one arm of the supporting frame to hold the cylinder at the desired elevation. We provide means whereby both ends of the cylinder may be lifted simultaneously from the driver's seat.

In the accompanying drawings:

Figure 1 is a side elevation of the hay loader constructed in accordance with the invention, and Figure 2 is a fragmentary plan view with certain of the parts removed.

Like numerals designate corresponding parts in both of the drawings.

The hay loader comprises a frame 5 which is supported upon front ground wheels 6 and rear ground wheels 7, the rear ground wheels constituting the driving means for the several mechanisms of the hay loader. The ground wheels are mounted upon a main shaft 8 which carries a slatted cylinder 9. A spur gear wheel on the shaft 8 indicated at 10 meshes with a spur gear wheel 11 which has affixed thereto a sprocket wheel 12. A sprocket chain 13 drives from the sprocket wheel 12 to a sprocket wheel 14 upon the shaft 15 of a slatted cylinder 16, and it is this slatted cylinder which it is desired to raise and lower. The slatted cylinder 16 is supported by substantially triangular frame members, said frame members comprising the converging parts 17 and 19 which are capable of swinging movement around the main shaft 8. In carrying out the invention we extend the members 19 of each of these triangular frames, to form a part 19ª and to these projecting portions we attach cables 20. The forward ends of these cables are attached to a transversely extending channel iron 21 which is swingingly supported in channels 22 that are pivoted at 23 to a part of the frame 5 of the hay loader. Cables 24 are attached to this channel at opposite sides of the center line of the machine and are carried forwardly to a common cable 25, said cable 25 being attached to an operating lever 26 disposed adjacent the driver's seat 27. Thus by manipulating the lever the cables may be drawn upon or slackened as the case may be and the triangular frames and the slatted cylinder 16 may be raised or lowered at will, both ends of the slatted cylinder being raised simultaneously and without requiring the driver to leave his seat.

The operating lever 26 moves over a toothed or notched segment 27 and may be held in any adjusted position by such segment in a well-known way. In the forward movement of the machine, ground wheels 7, and consequently the slatted cylinder 9, will rotate in a counter-clockwise direction, while the provision of the intermeshing gears 10 and 11 and the sprocket connections described, will cause the slatted cylinder 16 to rotate in a clockwise direction. Slatted cylinders of this sort, rotating in opposite directions, constitute the conventional pickup of hay loaders, and since the invention in the present case relates merely to specific mechanism for lifting the rear slatted cylinder, certain parts of the conventional hay loader have been omitted. For example, in actual use, the slatted cylinders are provided with hook-like wire fingers which, owing to the rotation of the cylinders in opposite directions, picks up the hay between them and lifts it to a point where it can be engaged by the inclined conveyor. As previously stated herein, it has been the practice heretofore to lift one end of the slatted cylinder 16 at a time. The present invention relates to means for lifting both ends of this cylinder simultaneously and by means of a very simple and inexpensive connection.

It is to be understood that the invention is not limited to the precise construction set forth but that it includes within its purview whatever changes fairly come within either the terms or the spirit of the appended claim.

Having described our invention, what we claim is:

A hay loader comprising a main supporting frame, a main slatted cylinder, an auxiliary slatted cylinder to the rear of the main cylinder, a supporting frame for the auxiliary cylinder, a pair of rods attached to the last named frame for elevating said auxiliary slatted cylinder, a swinging bar extending from side to side of the hay loader and hung from the main supporting frame and to which the forward ends of the rods are connected, cables attached to the outer portions of said bar and an operating rod disposed in advance of said bar and to which said cables are attached.

In testimony whereof they affix their signatures.

JOHN G. TAYLOR.
HIRAM STOKER.